United States Patent [19]

Holly et al.

[11] 4,260,888

[45] Apr. 7, 1981

[54] NON-CRYOGENIC INFRARED POSITION AND IMAGE SENSOR

[75] Inventors: Sandor Holly, Woodland Hills; Emery Erdelyi, Canoga Park, both of Calif.

[73] Assignee: Rockwell International Corporation, El Segundo, Calif.

[21] Appl. No.: 92,131

[22] Filed: Nov. 7, 1979

[51] Int. Cl.³ .................... H01J 31/49; H04N 5/33
[52] U.S. Cl. ................................. 250/330; 358/113
[58] Field of Search ............... 250/330, 331, 332, 333, 250/334, 342; 358/113

[56] References Cited

U.S. PATENT DOCUMENTS

| | | | |
|---|---|---|---|
| 3,524,016 | 8/1970 | Jacobs et al. | 250/330 |
| 3,939,347 | 2/1976 | Shifrin | 250/334 |
| 4,010,367 | 3/1977 | Suzuki | 250/330 |
| 4,035,654 | 7/1977 | Elmer | 250/342 |

*Primary Examiner*—Alfred E. Smith
*Assistant Examiner*—Janice A. Howell
*Attorney, Agent, or Firm*—H. F. Hamann; Harry B. Field

[57] ABSTRACT

An infrared image is formed on the surface of a light-sensitive silicon position sensor having four outer electrodes equally spaced around the periphery of the sensor and a central electrode. A bias voltage is applied between the outer electrodes and the central electrode. Changes in current at the central electrode is used to modulate the intensity of a CRO beam. A light beam is used to scan the surface of the sensor in a fixed pattern and the CRO beam is scanned in synchronism with the light beam. Thermal variations produced by the IR image modulate the CRO beam, producing a visual image on the CRO screen of the IR image formed on the sensor.

13 Claims, 3 Drawing Figures

NON-CRYOGENIC INFRARED POSITION AND IMAGE SENSOR

FIELD OF THE INVENTION

This invention relates to apparatus for converting infrared images into visual images, and more particularly, is concerned with the use of electro-optical components in an infrared position and image sensor.

BACKGROUND OF THE INVENTION

Various types of infrared position/image sensors have been developed for determining the position of or the image shape of an infrared radiation source. The image sensors are designed to convert an infrared image to a visual image. Infrared sensors generally are of either a cooled or uncooled variety. The cooled variety, usually cooled by liquid nitrogen or thermal-electric cooling, are used where high-speed, fast response times are required. However, such cooled types of sensors are usually expensive and technically cumbersome to use. The image sensing system usually requires either a plurality of discrete elements that are mechanically scanned or arrays that are electronically scanned. While infrared detectors that are uncooled are simpler and relatively inexpensive, they exhibit slow response times and are not generally applicable to image or position sensing. Bismuth film detectors have been developed which have been used as position sensors but have not yet proved to be very reliable in operation.

SUMMARY OF THE INVENTION

The present invention provides apparatus for converting the image of an infrared source into a visible image using an electro-optical sensor having temperature sensitive characteristics. The response time is comparable to cooled type sensors, yet the present invention does not require cooling and is relatively simple in design. Because it uses a conventional electro-optical sensor, the infrared image sensor of the present invention is relatively inexpensive.

These and other advantages are achieved by providing a light-sensitive silicon position sensor, having a central or common electrode and four equally spaced outer electrodes, with bias voltage applied between the center electrode and each of the outer electrodes. The image of an infrared source is formed on the surface of the position sensor. The surface is scanned in a predetermined scanning pattern by a collimated light beam from a light source, such as a laser. Variations in current at the center electrode during the scanning operations are used to modulate the intensity of the electron beam in a cathode ray oscilloscope (CRO) type display. At the same time, the electron beam is deflected in synchronism with the same scanning pattern as the light beam from the laser. The thermal sensitivity of the silicon sensor causes an increase in the current at the center electrode when the light beam scans across an area on the surface of the sensor that is receiving a higher level of energy from the infrared image.

BRIEF DESCRIPTION OF THE DRAWINGS

For a better understanding of the invention, reference should be made to the accompanying drawings, wherein.

DETAILED DESCRIPTION

Figure 1:
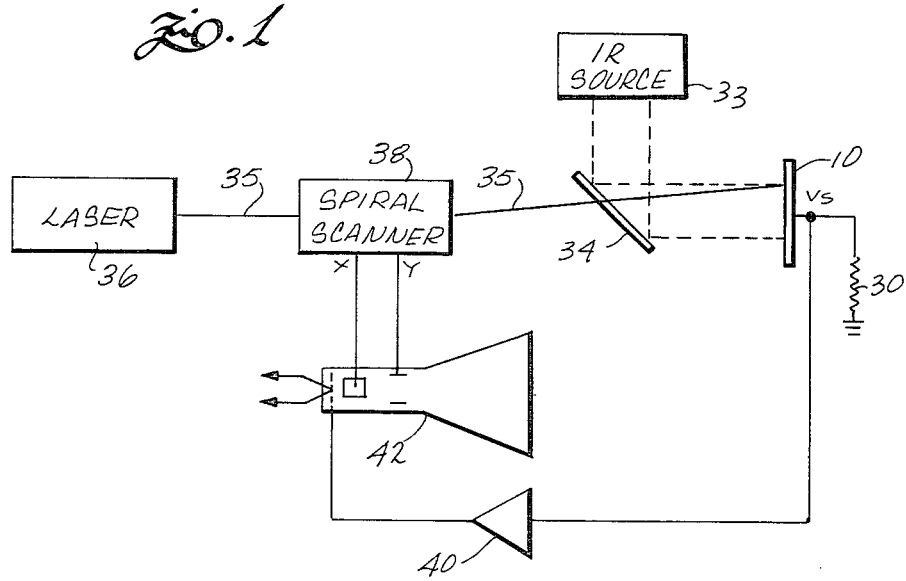
FIG. 1 is a schematic showing of the invention.

Referring to the drawings in detail, the numeral 10 indicates generally a silicon position sensor or detector, which is a commercially available electro-optical component in the form of a silicon disk which may, for example, be several inches in diameter. The disk is provided with four outer electrodes 12, 14, 16 and 18 which are equally spaced about the outer perimeter of the silicon chip. A center electrode is connected to the back surface of the disk. The back of the disk may also be coated with an electrically conductive layer over the entire back surface. The back surface is preferably mounted on a suitable heat sink that is electrically isolated from the surface of the disk.

Figure 2:
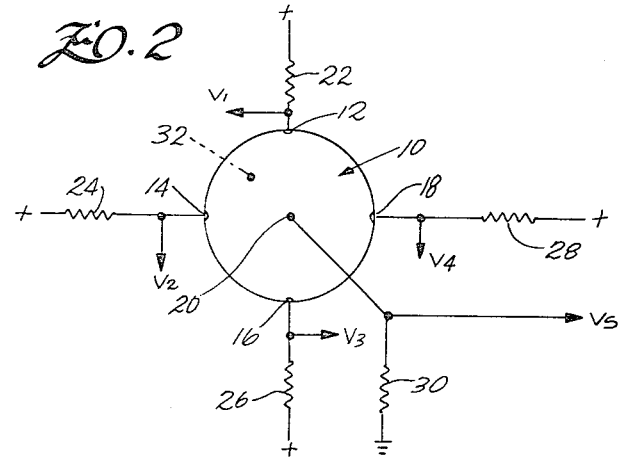
FIG. 2 is a schematic showing of the position sensor.

As shown in FIG. 2, the photosensitive position sensor 10 has the outer electrodes connected to one terminal of a bias voltage source by resistors 22, 24, 26 and 28, respectively. The common or central terminal or electrode 20 is returned to the other side of the potential source through a resistor 30. The position sensor operates essentially as a photovoltaic device. For example, if a point of light strikes the surface of the sensor at a particular point, such as indicated at 32, a current will flow from that point to each of the outer electrodes with the return path through the common electrode. The resistance of the current path to each of the outer electrodes is a function of the distance between the respective electrodes and the point 32. Thus from point 32 in FIG. 2, a larger current will flow through resistor 24 than flows through resistor 28, producing a higher voltage drop across the resistor 24. The X and Y coordinates of the point 32 are roughly proportional to the difference in voltage, $V_2 - V_4$ for the X coordinate and $V_1 - V_3$ for the Y coordinate. For example, by connecting the voltages $V_2$ and $V_4$ to the horizontal deflection plates and the voltages $V_1$ and $V_3$ to the vertical deflection plates of a cathode ray oscilloscope, the position of a point of light striking the surface of the position sensor will be visually indicated by the position at which the CR beam hits the screen, providing a visual indication of the position of the light spot. Electro-optical position indicators of this type are well known in the art.

According to the present invention, as shown in FIG. 1, the image of an infrared source 33 is reflected onto the surface of the position detector 10 by a mirror preferably in the form of a beam splitter, indicated at 34. The beam splitter allows the surface of the detector 10 to be also illuminated by a beam of light 35 preferably from a laser source 36. The low-power light beam is scanned in a predetermined pattern over the entire face of the detector 10 by a scanner device 38, which is preferably a mechanical scanner that causes the beam 35 to be repetitively scanned in a systematic pattern, such as a spiral pattern. By way of example, the spiral scan may include 20 revolutions per frame and 20 frames per second for scanning the area of a two-inch diameter position detector with a 0.1 inch beam. Other frame rates, turns per frame and sizes of beams may be selected depending upon the required resolution, the required response time, and the like.

As discussed above in connection with FIG. 2, as the position of the light beam is scanned through a spiral path, the voltages $V_1$, $V_2$, $V_3$ and $V_4$ will vary. However, the voltage $V_s$ across the resistor 30, as determined by the current flow through the common electrode 20, will remain substantially constant with changes in position. However, it has been found that the voltage across the resistor 30 is sensitive to temperature changes at the point of incidence of the light beam. By focusing the image of the infrared source on the surface of the detector, variations in surface temperature are produced which conform rather closely to variations in intensity of the infrared radiation over the image area. When the light beam strikes a point of higher temperature on the sensor 10, the voltage drop across the resistor 30 increases. Where the beam strikes a spot that is cooler in temperature, the voltage $V_s$ across the resistor 30 decreases.

Figure 3:
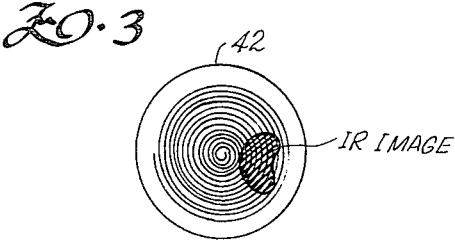
FIG. 3 shows a typical image display.

The voltage $V_s$ is amplified and used to modulate the intensity of the electron beam in a cathode ray oscilloscope. Thus the voltage $V_s$ is applied through an amplifier 40, in FIG. 1, to the control grid of a cathode ray tube 42. At the same time, the cathode ray tube beam is scanned in synchronism with the scanning of the light beam 35 to form a spiral pattern on the face of the cathode ray tube. By modulating the intensity of the cathode ray tube beam, a visual image is formed which corresponds to the image of the infrared source 33. The electron beam of the cathode ray tube can be scanned in response to voltages derived from the spiral scanner 38 so that the deflection is synchronized with the scanning movement of the beam 35. Alternatively, the electron beam may be deflected in response to the voltages derived at the outer electrodes of the position detector 10 in the manner described above. In either event, the beam is caused to trace out a spiral path with the intensity increasing in response to increases in temperature at the surface of the detector 10 produced by the infrared image. FIG. 3 shows a typical image pattern that is reproduced visually on the face of the cathode ray tube. By mounting the detector on a good heat sink, the thermal effects are limited to the top few microns of the detector surface where heating and cooling in response to changes in intensity of the infrared image may take place very rapidly when operating at normal ambient temperatures. Primarily, the response time is determined by the scanning speed of the laser beam.

From the above description it will be seen that the present invention provides apparatus for generating a visual image of an infrared energy source. This is accomplished by using a conventional light sensing element operating at ambient temperature conditions. The apparatus exhibits a fast response time to changes in intensity of the infrared source.

It is to be understood that what has been described is merely illustrative of the principles of the invention and that numerous arrangements in accordance with this invention may be deviced by one skilled in the art without departing from the spirit and scope thereof.

What is claimed is:

1. Apparatus for generating a visual image of an infrared radiation source, comprising: a light-sensitive thin silicon disk, means directing an infrared image onto one surface of the silicon disk, a light beam source, means scanning the light beam across said one surface of the disk in a predetermined pattern, means including a central electrode on the opposite surface from said one surface for applying a bias voltage to the disk, visual display means including a cathode ray beam tube, means responsive to changes in current in the central electrode of the disk for controlling the intensity of the cathode ray beam, and means for scanning the cathode ray beam in synchronism with and in the same pattern as the light beam.

2. Apparatus of claim 1 wherein the disk includes four outer electrodes spaced evenly around the perimeter of the disk, the bias voltage being applied between the central electrode and each of said outer electrodes.

3. Apparatus of claim 2 wherein the means for scanning the cathode ray beam includes means responsive to the voltages across pairs of opposing outer electrodes.

4. Apparatus of claim 2 wherein the means for scanning the cathode ray beam includes means operated by the means scanning the light beam for scanning the cathode ray beam and the light beam in unison.

5. Apparatus of claim 1 wherein the light beam source is laser.

6. Apparatus of claim 1 wherein the cross-section of the light beam is small compared to the radius of the disk.

7. Apparatus of claim 1 further including beam splitting means interposed between the scanner and the disk, the beam splitting means reflecting the infrared image onto the disk while transmitting the light beam from the scanner onto the disk.

8. Apparatus for producing a visual display of the image from an infrared source, comprising light-sensitive means providing an electrical signal that varies with the intensity of light striking the surface of said means, said light-sensitive means varying in light-sensitivity with changes in temperature of the light-sensitive surface, means directing the image from the infrared source onto the surface of the light-sensitive means, means generating a narrow light beam, means scanning the light beam over the surface of the light-sensitive means in a predetermined pattern at a fixed scanning rate, and display means visually indicating variations in the electrical signal from said light-sensitive means as the surface is scanned by the light beam.

9. Apparatus of claim 8 wherein said display means includes a two dimensional screen, means generating a point of light on the screen, means scanning the point of light in the same predetermined pattern and at the same fixed rate as the beam scans the surface of the light-sensitive means, and means responsive to said electrical signal for varying the intensity of said point of light on the screen.

10. Apparatus of claim 9 wherein the light-sensitive means includes a thin silicon disk.

11. Apparatus of claim 10 wherein the means generating a narrow light beam includes a laser.

12. Apparatus of claim 11 wherein the means scanning the light beams includes means for repetitively moving the beam in a spiral pattern across said surface.

13. Apparatus of claim 12 wherein the display means includes a cathode ray oscilloscope, the cathode ray being scanned synchronously with the light beam.

* * * * *